United States Patent
Foster et al.

(10) Patent No.: US 9,430,630 B2
(45) Date of Patent: Aug. 30, 2016

(54) CREDENTIAL-FREE IDENTIFICATION AND AUTHENTICATION

(71) Applicant: TextPower, Inc., San Juan Capistrano, CA (US)

(72) Inventors: Robert Foster, San Juan Capistrano, CA (US); Scott Goldman, Carlsbad, CA (US); Mark Nielsen, San Juan Capistrano, CA (US)

(73) Assignee: TEXTPOWER, INC., San Juan Capistrano, CA (US)

(*) Notice: Subject to any disclaimer, the term of this patent is extended or adjusted under 35 U.S.C. 154(b) by 0 days.

(21) Appl. No.: 14/815,895

(22) Filed: Jul. 31, 2015

(65) Prior Publication Data

US 2016/0034680 A1   Feb. 4, 2016

Related U.S. Application Data (60) Provisional application No. 62/031,392, filed on Jul. 31, 2014, provisional application No. 62/190,565, filed on Jul. 9, 2015.

(51) Int. Cl.
*G06F 21/34* (2013.01)
*G06F 21/35* (2013.01)
*G06F 21/42* (2013.01)

(52) U.S. Cl.
CPC .......... *G06F 21/34* (2013.01); *G06F 21/35* (2013.01); *G06F 21/42* (2013.01)

(58) Field of Classification Search
CPC ........ G06F 21/34; G06F 21/36; G06F 21/35; G06F 21/42
See application file for complete search history.

(56) References Cited

U.S. PATENT DOCUMENTS

| | | | | |
|---|---|---|---|---|
| 8,572,366 | B1* | 10/2013 | Yadav | H04L 63/08 713/154 |
| 2007/0015492 | A1* | 1/2007 | Bravo | G06F 12/122 455/411 |
| 2008/0281737 | A1* | 11/2008 | Fajardo | G06Q 40/00 705/35 |
| 2010/0269162 | A1* | 10/2010 | Bravo | G06F 21/31 726/6 |
| 2011/0302627 | A1* | 12/2011 | Blom | H04L 63/0492 726/2 |
| 2012/0066749 | A1 | 3/2012 | Taugbol | |
| 2013/0160083 | A1* | 6/2013 | Schrix | G07C 9/00309 726/3 |
| 2014/0040628 | A1* | 2/2014 | Fort | G06F 21/34 713/182 |
| 2014/0223520 | A1 | 8/2014 | Gafni | |

* cited by examiner

*Primary Examiner* — Matthew Smithers
(74) *Attorney, Agent, or Firm* — Fish & Tsang LLP (57) ABSTRACT

A method of authenticating a user so that the user can access a website without entering a unique user credential. A user accesses a target and is presented with an authentication code and an address, and the user sends a message containing the authentication code to that address. Alternatively, the user is pre-supplied with an address and is presented only with an authentication code when the user accesses the target. The user's identity is authenticated by comparing an aspect of the metadata of the message with known metadata aspects, and the user is authenticated by comparing the authentication key presented to the user with the one received in the message. Both the user and the user's identity are authenticated in a single step without requiring the user to input any unique user credential.

14 Claims, 4 Drawing Sheets

CREDENTIAL-FREE IDENTIFICATION AND AUTHENTICATION

This application claims the benefit of priority to U.S. provisional application 62/190,565 filed on Jul. 9, 2015 and U.S. provisional application 62/031,392 filed on Jul. 31, 2014. These and all other extrinsic references referenced herein are incorporated by reference in their entirety.

FIELD OF THE INVENTION

The field of the invention is user identification and authentication.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Authentication of users attempting to access a secured digital location is an important step to take toward ensuring the safety of a user's personal information, and also in ensuring the safety of the digital location's information. Others have developed ways of authenticating users, but these previous attempts fail to appreciate improvements discussed herein.

U.S. Patent Appl. No. 2010/0269162 to Bravo et al. describes an authentication system for websites, but the system is focused more on the security of the website rather than the security of a user. Although the application discusses the use of a one-time password for website verification, it fails to appreciate a number of possible improvements. It fails to appreciate, among others, the benefits of authenticating a user rather than authenticating a website and that authentication of a user can be accomplished by means other than achieving a voice-call connection with the user. It also fails to appreciate the additional security provided by a user-generated message (i.e., a message originating from a user's device such as a mobile phone), which is unavailable when a system or method presumes the target contacting the user with a message authenticates a user.

In U.S. Patent Appl. No. 2012/0066749 to Taugbol et al., inventors attempted to create an improved authentication system. The system requires a user to first input a user ID as a first step in the authentication process. In doing so, the system fails to appreciate that it is possible to create an authentication system that does not require a user ID to perform user authentication.

Thus, there is still a need for an improved user identification and authentication system.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems and methods in which a user's identity is authenticated so that the user can access a service or physical facility. To do this, the user first navigates to a "target", which might for example be a web page corresponding to a service or physical location. During the authentication process, the target presents an authentication key and address to the user without first requiring the user to provide a unique user credential. The user then sends a message to the provided address via a device controlled and/or operated by the user (e.g., a cell phone) that includes the authentication key. As a first form of authentication, the user's identity is verified using metadata transmitted with the message. As a second form of authentication, the user-entered authentication key in the message is compared to the authentication key previously presented by the target. Comparing can be conducted by either the target or by a third party. Thus, a service outside of the target could conduct the comparison portion of the method without deviating from the inventive concepts described in this application.

To initiate authentication in preferred embodiments, a user first navigates to a target to which the user wishes to gain access, and then performs an action to initiate authentication where that action does not include the provision of a unique user credential. For purposes of the method, providing a unique user credential is defined as the manual entry of a user credential, either via keyboard operation or voice input, directly or indirectly by the user that wishes to be authenticated. Examples of a unique user credential include a username/userID and/or password, social security number, driver's license number, date of birth, or any other type of information unique to the user. In preferred embodiments, for example, a user could navigate to a website, and—without providing a unique user credential—click on a button that says "Enter" or "Login." The user would then be presented with an authentication address and a one-time password.

In some embodiments, the authentication key is presented to the user without presenting the authentication address (sometimes known as a "destination"). In a corporate environment, for example, instructions for the use of this service that specify where the authentication key must be sent to when it appears on the company's website may be distributed in advance of employee use. In this manner no address will be displayed as it will be known in advance.

In some embodiments, systems and methods include a pre-authentication step of receiving a message from a cellular carrier approving the user's device as being a legitimately registered device on the cellular carrier's network. Verification of the user's device via the cellular network allows the method to quickly and easily match an incoming message containing an authentication key with a particular user by matching a UDID, a phone number, or some other type of metadata.

In another step, a user-transmitted message sent to the provided address is received, where the provided address corresponds to the target. In some embodiments, the authentication address is specific to a particular website or web service. In other embodiments, the authentication address can comprise an SMS short code, can be rotated and selected from a pool of available addresses, or it can comprise a phone number.

It is contemplated that in some embodiments, the target can be a web service, a web page, a phone network, or an appliance. For example, as a web service, the target could be a mobile application that provides a particular service where user identity is very important (e.g., Venmo™ or PayPal™—both services that deal with money and cash flow). As a web page, the target could be a bank's website. Bank websites require increased security to verify users since sensitive financial information is easily accessible if a nefarious user were to gain control of an account.

Another possible target is a phone network, or even an appliance. Appliances that may benefit from this method of user authentication include security systems, but can also include standard household appliances. Increasingly, homes are being outfitted with smart appliances that can be controlled from mobile devices (e.g., thermostats, light bulbs, lighting systems, doors, garage doors, ovens, stoves, refrigerators, etc.). Through these devices, an unauthenticated user could potentially gain access to another's home by, for example, opening a garage door or unlocking the home. In the same vein, commercial applications are also contemplated. For example, the method could be implemented to authenticate users who wish to access commercial building control systems, which can grant control over everything from building security to air conditioning systems.

The user-transmitted message can advantageously be sent from a user-operated device. In preferred embodiments, the user-operated device used to transmit the message is a cell phone. In other embodiments, however, the user-operated device is a device capable of making or receiving voice calls (e.g., a computer, a land-line telephone, a tablet, a car, or any device not mentioned that is equipped to make VoIP calls). In still other embodiments, the user-operated device is any device capable of making or receiving text messages (e.g., MMS, SMS, Gadu-Gadu™, IRC™, Windows™ Messenger Service, MSNP™, Mumble™, OSCAR™, RVP™, SIP/SIMPLE™, Steam Friends™, Skype™, TOC2™, XMPP/Jingle™, YMSG™, Zephyr™ Notification Service, or any other service capable of transmitting text-based messages). Regardless of the message protocol implemented, preferred embodiments utilize metadata and a test key conveyed within or along with the message is used to authenticate the identity of the user.

As noted above, the user-transmitted message preferably contains a test passkey, and also a device identifier corresponding to a user-operated device where the message originates. The test passkey is preferably included in the message by the user, and should be identical to the provided authentication key for successful authentication. The authentication key in preferred embodiments is a one-time password. The one-time password can be generated for single use, or it can be limited to a particular time frame, or both. In preferred embodiments, the device identifier comprises a UDID, but it can also comprise a phone number or MAC address, a position (e.g., some or all of a GPS location), a time, and/or any other metadata information conveyed with a standard text message or voice call. It is important that the device identifier allow for identification of a particular device as belonging to a particular user. To identify a user, for example, the UDID of a device is matched to a stored UDID corresponding to a known user. So when a message is received having that UDID, the user will be known and their identify authenticated.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

One should appreciate that the disclosed authentication systems and methods provide numerous advantageous technical effects. For example, the authentication systems and methods enables authentication of users to utilize a service without requiring the users to remember and provide complicated login credentials (e.g., user identifier and passwords, etc.).

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Two electronic devices that are "functionally coupled" to one another are generally connected to one another through an electronic network that allows data to be transmitted from one electronic device to another.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods in which an authentication engine authenticates a user to access a target service (e.g., an online service such as an online banking service or an online social media service, a communication session between devices, a healthcare network, a gaming environment, entry of an enclosed space, etc.) via a target user interface (e.g., a personal computer, a tablet, an ATM machine, etc.) by first presenting an authentication passkey and an authentication address to the target user interface, without requiring the user to input any user credentials (e.g., user identifier, user pass code, etc.). The user is then instructed to use a user-controlled device associated with the user (e.g., a mobile phone) to send the authentication passkey to the authentication address. Upon receiving a test passkey from the user-controlled device, the authentication engine verifies the passkey and the identity of the user-controlled device, and authenticates the user to use the service via the target user interface.

Figure 1:
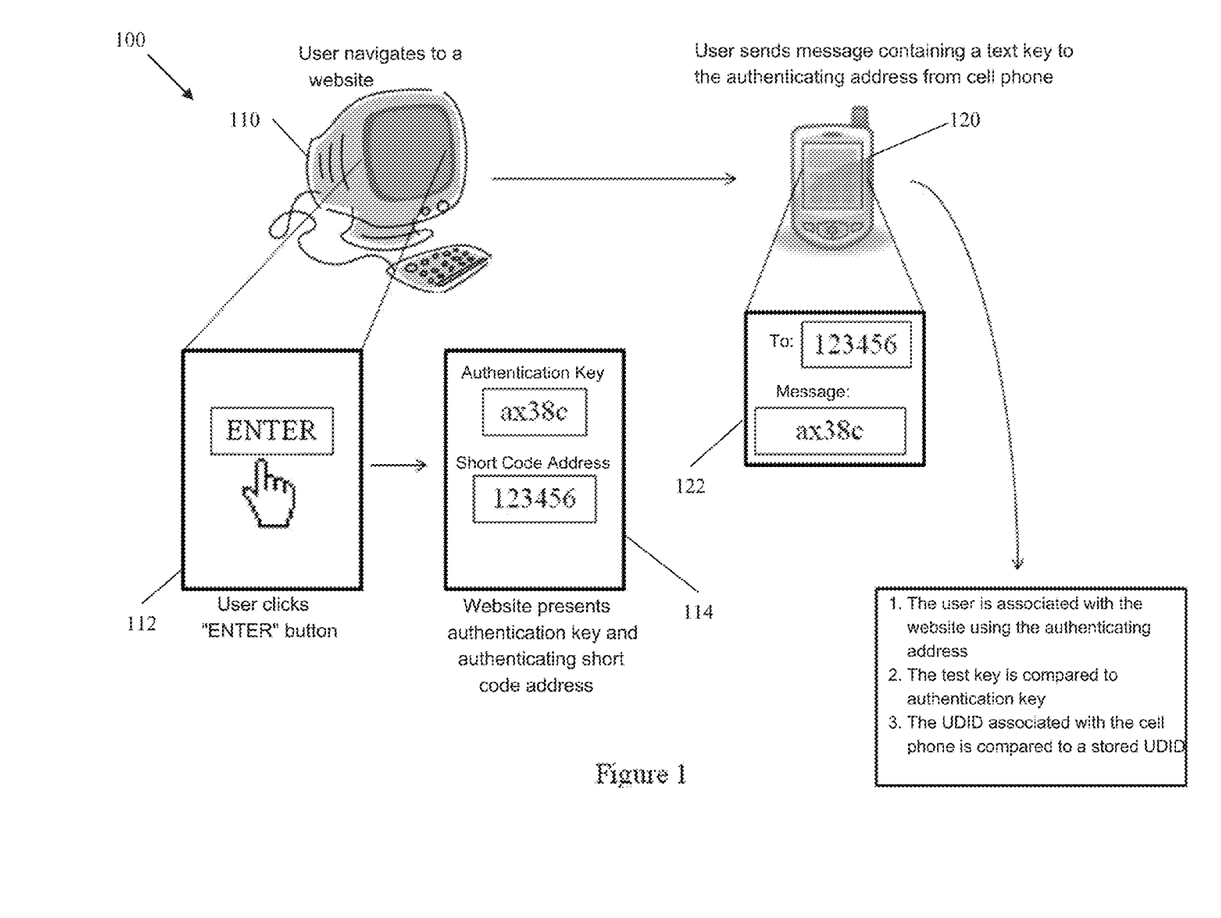
FIG. 1 illustrates an environment in which an exemplary authentication system can operate.

FIG. 1 illustrates an exemplary environment in which the authentication system 100 can operate. The authentication system 100 is functionally connected to a target user interface 110 and a user-controlled device 120 in such a way that data can be transmitted to and from the target user interface 110, and at least from the user-controlled device 120. In some embodiments, the target user interface 110 is programmed to receive a request from a user to access a service. The request can be presented as selecting an "ENTER" button, as shown as screen 112 from the target interface 110. However, the request can be implemented in other ways, such as simply by accessing a particular website (via a URL) associated with the service (e.g., accessing an online banking service, etc.). Upon receiving such a request, the target interface 110 is programmed to present both an authentication passkey and an authentication address to the user. Specifically, the target interface 110 is programmed to present both the authentication passkey and authentication address to the user without requiring the user to first provide any user credentials (e.g., user login, user password, etc.). In some embodiments, the system could be configured to continuously present the authentication passkey and the authentication address to the user through the target user interface 110, thus negating the requirement that the user needs to first initiate any kind of request whatsoever before the authentication passkey and authentication address is presented to the user (typically through target user interface 110).

In this example, the authentication passkey is in the form of an alpha-numeric key and is shown in a box underneath the title "Authentication Key" in screen 114. The authentication address is in the form of a short code and is shown in the box underneath the title "Short Code Address" in the screen 114 as well. The user is also instructed to use the user-controlled device 120 to send a message 122 that includes the provided authentication passkey to the authentication address. In these embodiments, the message 122 that is sent to the authentication address also includes a device identifier that can uniquely identify the user-controlled device 120. The identifier can be a phone number associated with the user-controlled device 120, a media access control address (MAC address) associated with the user-controlled device 120, a Unique Device Identifier (UDID), or any other device identifier. In some embodiments the message is an SMS message that inherently contains device identifier information when the user-controlled device transmits the SMS message to the authentication address. In other embodiments, the message could be sent through some sort of proprietary software, which also embeds custom identifying information with the message to ensure that the system that receives the message can verify the identity of the device sending the message.

The authentication address is preferably an address that is associated with the authentication engine, such that the authentication engine can receive the message 122 from the user-controlled device 120. Upon receiving the message 122, the authentication is programmed to verify the passkey that is included in the message 122 (the "test passkey") and to verify that the device identified by the embedded the device identifier in the message is a device that is authorized to gain access to the target service. Based on the verification, the authentication engine is programmed to authenticate the user to access the target service via the target user interface 110.

Figure 2:
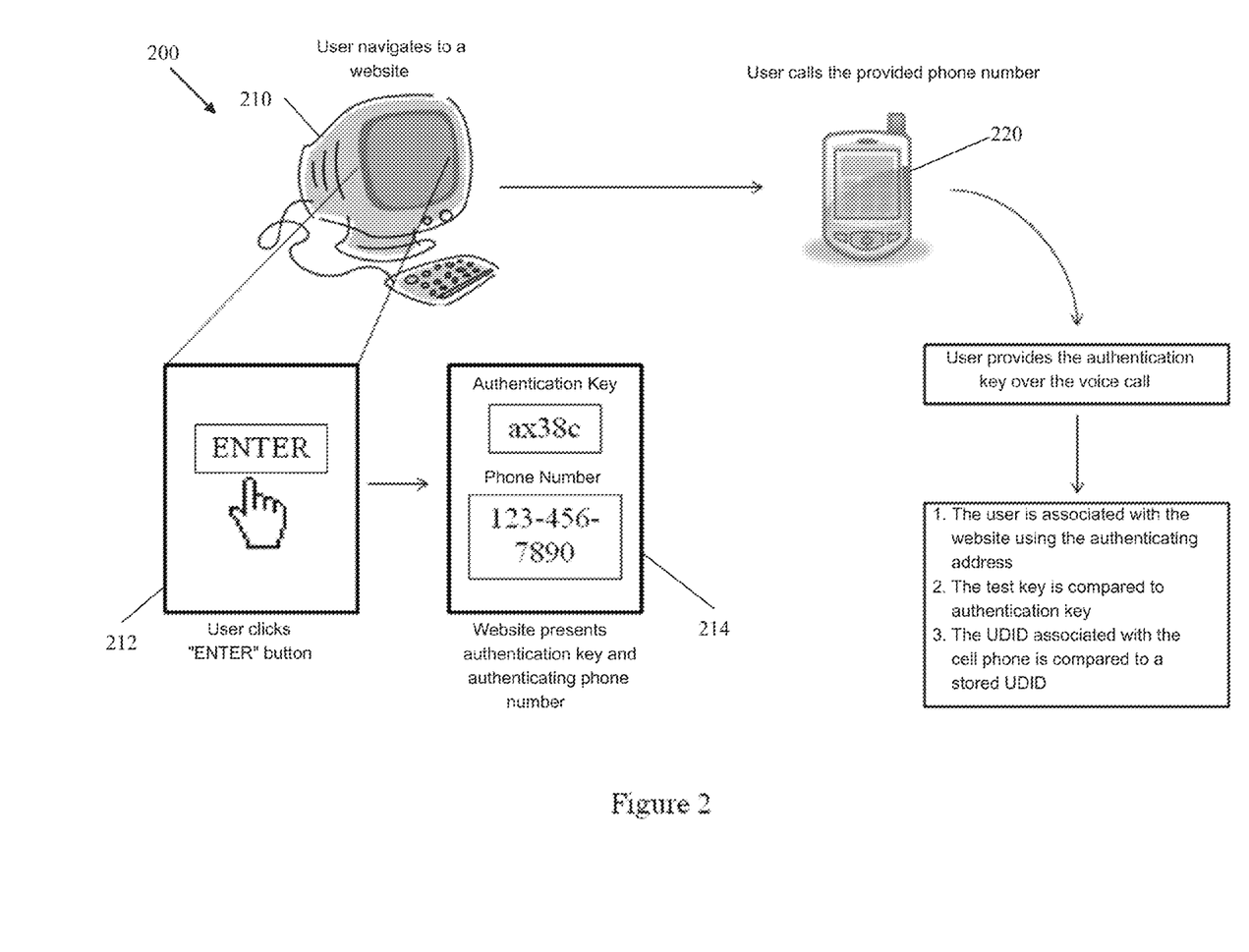
FIG. 2 illustrates another environment in which an exemplary authentication system can operate.

FIG. 2 illustrates another exemplary environment 200 in which the authentication system 200 can operate. Similar to the authentication system 100, the authentication system 200 includes a target user interface 210 and a user-controlled device 220. The target user interface 210 is programmed to prompt a user for a request to access a service via screen 212. Upon receiving the request, the target user interface 210 presents an authentication passkey and an authentication address via screen 214. Specifically, the target interface 210 is programmed to present both the authentication passkey and authentication address to the user without requiring the user to first provide any user credentials (e.g., user login, user password, etc.). In this example, the authentication passkey is in the form of an alpha-numeric key and is shown in a box underneath the title "Authentication Key" in screen 214. The authentication address is in the form of a phone number and is shown in the box underneath the title "Phone Number" in the screen 214 as well. The user is also instructed to use the user-controlled device 220 to send a message that includes the provided authentication passkey to the authentication address.

Upon receiving the message, the authentication is programmed to verify the passkey that is included in the message (the "test passkey") and the device identifier. Based on the verification, the authentication engine is programmed to authenticate the user to access the service via the target user interface 110.

The authentication engine will be described in more detail below by reference to FIGS. 3 and 4.

Figure 3:
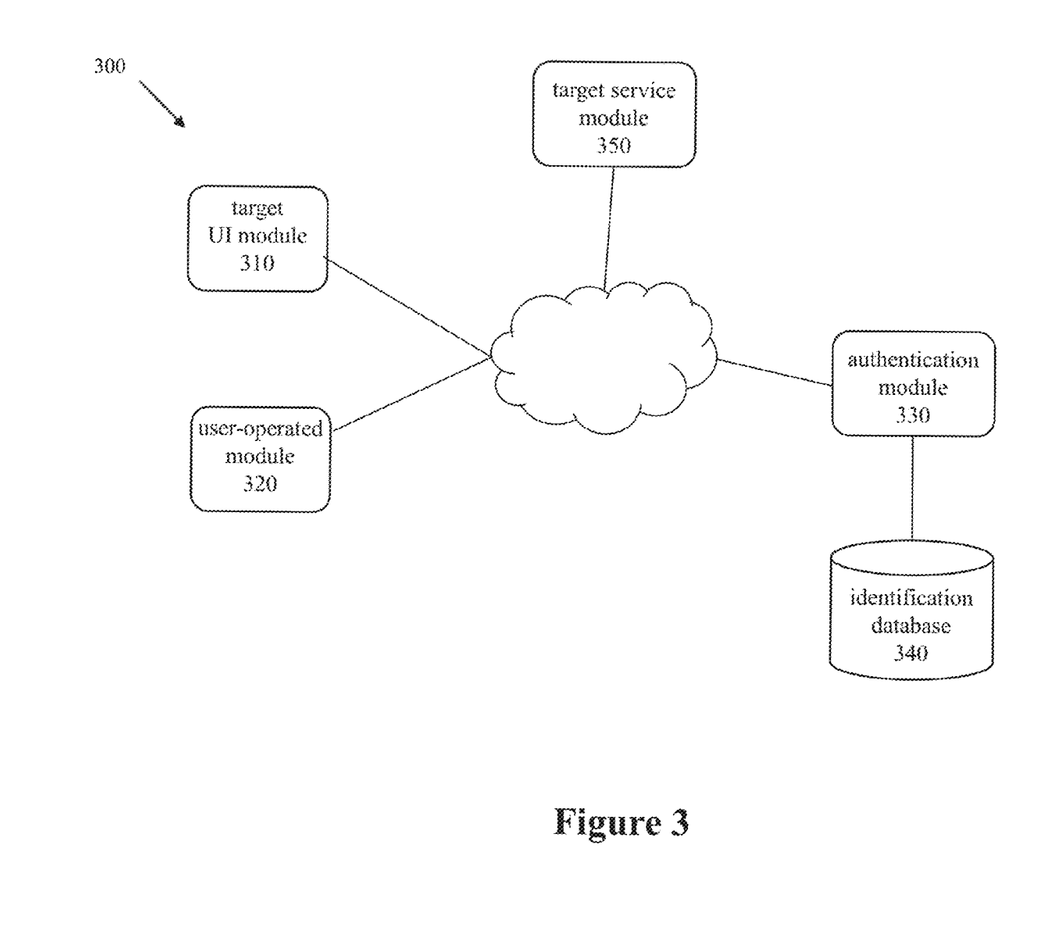
FIG. 3 illustrates a block diagram of the authentication system of some embodiments.

FIG. 3 illustrates a block diagram of an embodiment of an authentication system 300. The authentication system 300 includes one or more target user interface (UI) modules 310, one or more user-operated device modules 320, one or more target service modules 350, an authentication module 330, and an identification database 340.

In some embodiments, the authentication module 330 is programmed to store associations between user credentials and device identifiers in the identification database 340. For example, the authentication module 330 could be programmed to prompt users for the credential and identifier information during a registration service for using the authentication service provided by the authentication system 300. Users can supply a user identifier (e.g., login name), and the unique identifier of the device that the user wants to be associated with (e.g., a MAC address of the user's mobile phone, a private key that is automatically transmitted with every message from the user-controlled device). In some of these embodiments, the authentication module 330 is also programmed to prompt the user for an address associated with a service that the user intends to use in the future and store the service address along with the user credentials and device identifiers in the identification database 340.

The authentication module 330 is communicatively coupled to one or more target UI modules 310 over a network (e.g., the Internet, a local area network, etc.). Each target UI module 310 can be incorporated into a target UI (e.g., target UI 110 of FIG. 1, target UI 210 of FIG. 2, etc.). For example, one target UI module 310a can be incorporated into a web browser on the personal computer of a user, another target UI module 310b can be incorporated into an ATM machine, yet another target UI module 310c can be incorporated into a tablet of another user. In some embodiments, the authentication module 330 is programmed to generate a unique authentication passkey and/or a unique authentication address for each target module 310, such that the authentication module 330 can uniquely identify a target UI module 310 based on the authentication passkey and/or the authentication address. In some of these embodiments, the authentication module 330 is programmed to even generate multiple unique authentication passkeys for each target module 310, so that a unique authentication passkey can be used for a target module 310 for only a duration of time. When a new unique authentication passkey is generated by the system, the system could cause one of the previously sent unique authentication passkeys to expire.

In addition, it is contemplated that the authentication module 330 is programmed to generate the authentication passkeys independent of the users who will be using them in the future. In other words, the authentication passkeys could be user agnostic. The authentication module 330 is also programmed to store the authentication passkeys and their associated target UI modules 310 in the identification database 340.

A user can make a request to access a service associated with any one of the target service modules 350 via any one of the target UI modules 310. In some embodiments, the user might make a request to access the target service via some other user interface, in a manner that identifies the target UI module. For example, a user could send a text message from a mobile phone of a QR code stuck to the monitor of a terminal, which uniquely identifies the terminal to authentication module 330. Different implementations of the target UI modules 310 could be programmed to enable the user to make such a request in different ways. For example, a target UI module 310 (e.g., target UI module 310a) can enable the user to make a request to access a service simply by typing the URL associated with the service in the web browser that incorporates the target UI module 310a. Another target UI module 310 (e.g., target UI module 310b) can enable the user to make a request to access a service by selecting a user interface element (e.g., a button) on the user interface provided by the target UI module 310b. The target UI module 310 is programmed to then send the request to the authentication module 330.

In the embodiments that the authentication module 330 does not pre-generate the authentication passkeys for the target UI modules 310, the authentication module 330 is programmed to, upon receiving the request from the target UI module 310, generate a unique authentication passkey for the target UI module 310. In other embodiments where the authentication module 330 pre-generates the authentication passkeys for the different target UI modules 310, the authentication module 330 is programmed to retrieve the unique authentication passkey for the specific target UI module 310 from the identification database 340. Once the unique authentication passkey is generated or retrieved, the authentication module 330 is programmed to present the unique authentication passkey to the target UI module. In this example, a user "John" requests to access a banking service via target UI module 310a. Thus, the authentication module 330 sends a unique authentication passkey associated with the target UI module 310a to the target UI module 310a, for presentation to the user John.

In some embodiments, the target UI module 310a is programmed to present the authentication passkey and an authentication address associated with the authentication module 330 (e.g., a web address that is associated with the authentication module 330, etc.) to John in a user interface. In addition, the target UI module 310a is also programmed to instruct, via the user interface, the user to use the user operated device module 320 on the John's device (e.g., user operated device module 320a) to send the authentication passkey to the authentication address. After John has inputted the authentication passkey into the user operated device module 320a of his device, the user operated device module 320a is programmed to encapsulate the authentication passkey as a test passkey in a message and send the message to the authentication module 330 via the authenticated address.

In some embodiments, during the registration process to the authentication service, the authentication module 330 is programmed to assign a user-operated module identifier to the user-operated module 320a that is unique to the user-operated module 320a from other user-operated modules 320. The user-operated module identifier can be stored within the user-operated module 320a on John's device. In addition, the user-operated module identifier can be encrypted so that the user or other people will not be able to access it. In these embodiments, the user operated device module 320a is also programmed to embed the user-operated module identifier for the user-operated module 320a within the message. In other embodiments, the user operated device module 320a is programmed to embed a unique identifier of John's device (e.g., a phone number, a MAC address, a UDID address, etc.) within the message before sending it to the authentication module 330.

Upon receiving the message from the user operated module 320a, the authentication module 330 is programmed to detect similarities between the received authentication passkey (the "test passkey") in the message and the numerous authentication passkeys that are associated with the different target UI modules 310 to identify a match. A match exists when a test passkey and an authentication passkey are identical. In this example, assuming that John types the correct authentication passkey into his device, the authentication module 330 should be able to find a match between the test passkey in the message and the authentication passkey that is associated with the target UI module 310a.

The authentication module 330 is also programmed to determine whether the user-operated device that originates the message is an authorized device to use the requested service by comparing the device identifier against a set of device identifiers stored in the identification database 340. When the authentication module 330 finds a match between the device identifier of John's device and one of the device identifiers stored in the identification database 340, the authentication determines that John has authority to access the requested service. Thus, the authentication module 330 is programmed to authorize the target UI module 310a to access the target service via the target service module 350. Since the authentication passkey is unique to each target UI module 310, the authentication module 330 is capable of determining the proper target UI module (e.g., target UI module 310a) among the numerous target UI modules 310 to authorize access to the service.

On the other hand, if the authentication module 330 fails to find a match between the device identifier of John's device and one of the device identifiers stored in the identification database 340, the authentication module 330 is programmed to deny the target UI module 310a access to the requested service.

While some of the services, such as access to an enclosed space or access to user-independent content, is independent of the identity of the user who accesses the service, it is also contemplated that other services, such as online banking service or ATM, are user dependent. Thus, when the requested service is a user-dependent service, the authentication module 330 is also programmed to retrieve user credential that is associated with the user controlled device from the identification database 340 and sends the credential information to the target UI module 310a so that the target UI module 310a can access the service from the target service module 350 using the user credential information.

One can understand that with this authentication system, different users can gain access to the same service via the same target user interface (e.g., a public computer, an ATM machine, a shared computing resource, etc.) without having to remember and enter user credentials at the target user interface. For example, when a different user "Mary" wishes to access the same service at the target UI module 310a.

Mary can use the user-operated module 320b at her device to send the same authentication passkey to the authentication module 330 to gain access. The authentication module 330 can verify that the test passkey matches with the authentication passkey associated with the target UI module 310a. However, since the device identifier (e.g., a user-operated module identifier generated specifically for user-operated module 320b) is associated with Mary, instead of John, the authentication module 330 is programmed to first determine whether Mary is authorized to access the service, and if so, to allow Mary to access the service via target UI module 310a. If the service requested is user-dependent, the authentication module 330 is also programmed to send Mary's credential to target UI module 310a so that the target UI module 310a can access the service from the target service module 350 using Mary's credential. For example, Mary will be able to log onto her personal banking account using this method, at a publicly shared computer, without having Mary to type in her user name and password at the publicly shared computer.

In some embodiments, target UI module 310 sends a request to authentication module 330 via target service module 350. For example, target UI module 310 could be a browser coupled to a backend of target service module 350. Target UI module 310 could request access to target service module 350, which then triggers target service module 350 to then transmit a request to verify target UI module 310 to authentication module 330. Authentication module 330 could then transmit an authentication passkey and an authentication address to target service module 350, which then forwards the authentication passkey and authentication address to target UI module 310. Then, after authentication module 330 verifies that the authentication passkey was sent to the authentication address from user-operated module 320 (verified through the device identifier transmitted with the message), the authentication module 330 could send an authorization certificate to target service module 350, which then provides the target service to target UI module 310.

Figure 4:
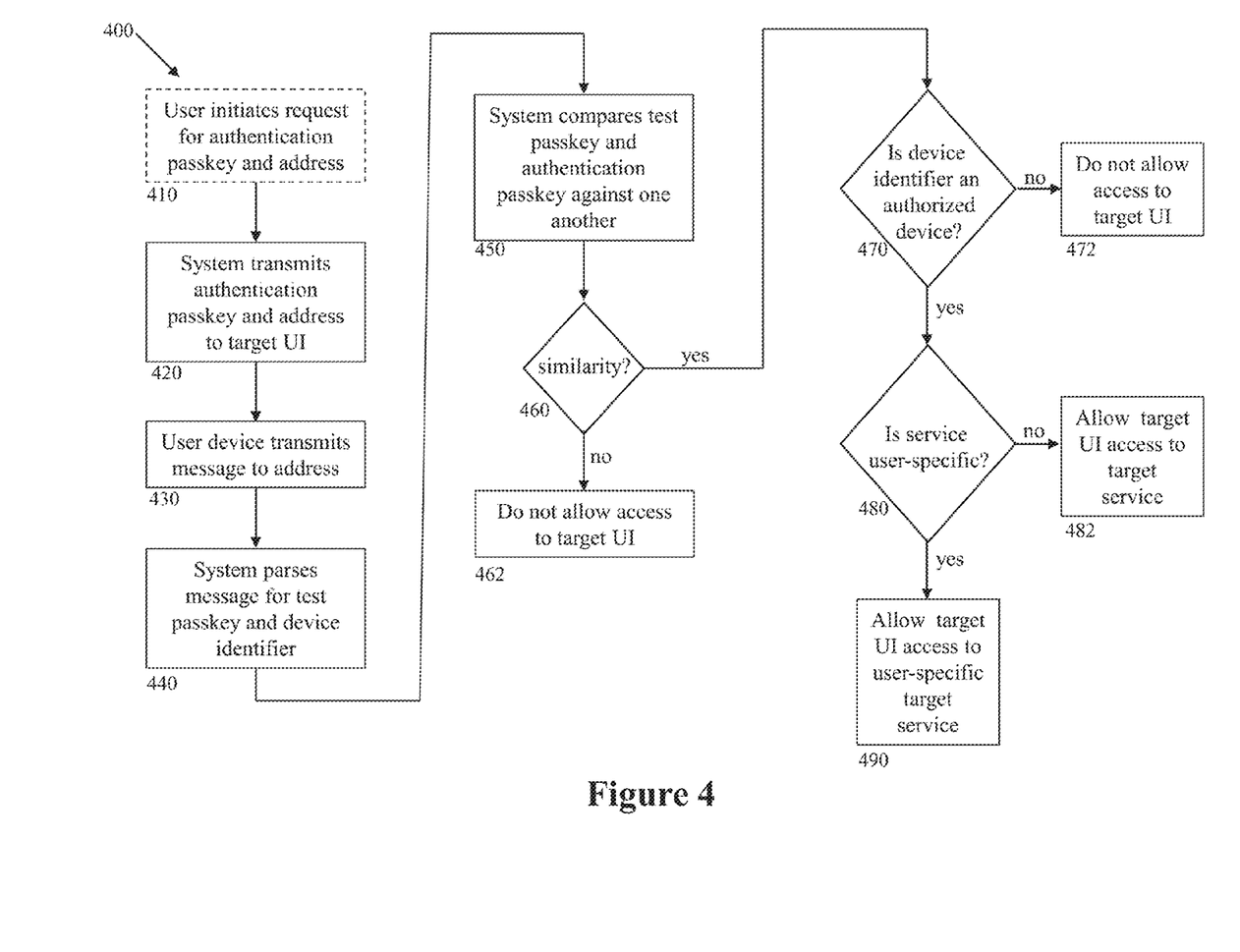
FIG. 4 illustrates a process for utilizing a user-operated device to authenticate a user with respect to a service

FIG. 4 illustrates a process 400 for utilizing a user-operated device to authenticate a user with respect to a service. The process 400 begins by a user initiating (at step 410) a request for authentication. For example, the user can initiate the request by directing a web browser to a URL associated with the target service (e.g., a banking website, etc.) or selecting a UI element. The authentication engine then transmits (at step 420) authentication passkey and authentication address to the target UI. Next, the user device transmits (at step 430) a message that includes a passkey inputted by the user and a device identifier to the authentication address.

The authentication engine then parses (at step 440) the message for the test passkey and the device identifier, and then compares (at step 450) the test passkey with the numerous authentication passkeys stored in the database. Next, the process 400 determines (at step 460) whether the test passkey is similar to any one of the stored authentication passkeys.

If it is determined that the test passkey is not similar to any one of the stored authentication passkeys, the process denies (at step 462) the target UI access to the service. On the other hand, if the process finds a match (a substantial similarity) between the test passkey and one of the stored authentication passkeys, the process determines (at step 470) whether the device identifier indicates that the user-controlled device is an authorized device.

If it is determined that the device is not an authorized device (e.g., the device identifier does not match any device identifiers stored in the database, etc.), the process denies (at step 472) the target UI access to the service. On the other hand, if the process determines that the device is an authorized device (e.g., the device identifier matches with one of the device identifiers stored in the database, etc.), the process determines (at step 480) whether the requested service a user-specific service.

If it is determined that the service is not a user-specific service (e.g., access to an enclosed space, access to user-independent content, etc.), the process allows (at step 482) the target UI access to target service. On the other hand, if it is determined that the service is a user-specific service (e.g., online banking service, ATM service, etc.), the process grants (at step 490) the target UI access to the user-specific target service based on the user credential stored in the database.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of utilizing a user-operated device to authenticate a user with respect to a target service, comprising:
   presenting, to a target user interface, an authentication passkey and an authentication address without first requiring the user to provide a unique user credential;
   receiving, from the user-operated device, a message addressed to the authentication address, and comprising a test passkey and a device identifier;
   detecting a similarity between the test passkey and the authentication passkey;
   identifying the user-operated device as an authorized device by comparing the device identifier against a stored set of identifiers;
   retrieving user credentials comprising at least a user identifier and a password by querying a user database using solely the device identifier; and
   submitting the retrieved user credentials to target user interface for accessing the target service.

2. The method of claim 1, further comprising generating, upon receipt of a request, the authentication passkey without first requiring the user to provide a unique user credential.

3. The method of claim 2, wherein generating the authentication passkey comprises generating a authentication passkey that is unique to the target user interface.

4. The method of claim 2, wherein the request comprises a username associated with the user.

5. The method of claim 1, wherein the authentication passkey is user agnostic.

6. The method of claim 1, further comprising associating the target service with the user based on the device identifier.

7. The method of claim 1, further comprising associating the target service with different users based on different device identifiers.

8. The method of claim 1, wherein the target user interface comprises an ATM machine.

9. The method of claim 8, wherein authorizing the target user interface to access the target service comprises initiating a transaction with a bank account associated with the user.

10. The method of claim 1, wherein the target service comprises at least one of a web service, a phone network, an appliance, and entry to an enclosed space.

11. The method of claim 1, wherein the user-operated device comprises a cell phone.

12. The method of claim 1, wherein the authenticating address comprises at least one of a URL, an SMS short code, and a phone number.

13. The method of claim 1, wherein the authenticating address is rotated, and selected from a pool of available addresses.

14. The method of claim 1, wherein the device identifier comprises at least one of a phone number, a MAC address, and a UDID number.

* * * * *